(12) United States Patent
Sachdeva et al.

(10) Patent No.: US 11,763,551 B2
(45) Date of Patent: Sep. 19, 2023

(54) SYSTEMS AND METHODS FOR FINE TUNING IMAGE CLASSIFICATION NEURAL NETWORKS

(71) Applicant: ASSA ABLOY AB, Stockholm (SE)

(72) Inventors: Kapil Sachdeva, Round Rock, TX (US); Sylvain Jacques Prevost, Austin, TX (US)

(73) Assignee: ASSA ABLOY AB, Stockholm (SE)

( * ) Notice: Subject to any disclaimer, the term of this patent is extended or adjusted under 35 U.S.C. 154(b) by 228 days.

(21) Appl. No.: 16/807,825

(22) Filed: Mar. 3, 2020

(65) Prior Publication Data

US 2021/0279528 A1    Sep. 9, 2021

(51) Int. Cl.
*G06N 3/08* (2023.01)
*G06N 3/047* (2023.01)
(Continued)

(52) U.S. Cl.
CPC ...... *G06V 10/7784* (2022.01); *G06F 18/2148* (2023.01); *G06F 18/2155* (2023.01);
(Continued)

(58) Field of Classification Search
CPC ....... G06F 21/32; G06F 17/18; G06N 3/0454; G06N 3/08; G06N 3/04; G06N 20/20;
(Continued)

(56) References Cited

U.S. PATENT DOCUMENTS 10,282,852 B1 * 5/2019 Buibas ................. G06T 7/277

2004/0213437 A1 * 10/2004 Howard ............. G06K 9/00248
382/115
(Continued)

FOREIGN PATENT DOCUMENTS

CN    107305624 A  * 10/2017
EP    2978249 A1   *  1/2016  ............. H04W 12/06
(Continued)

OTHER PUBLICATIONS

Nambiar et al., Gait-based Person Re-identification: A Survey, Apr. 26, 2019 [retrieved Dec. 13, 2021], ACM Computing Surveys, vol. 52, Issue 2, Article No. 33, 34 pages. Retrieved: https://dl.acm.org/doi/abs/10.1145/3243043 (Year: 2019).*
(Continued)

*Primary Examiner* — Matthew C Bella
*Assistant Examiner* — Dennis Rosario
(74) *Attorney, Agent, or Firm* — Schwegman Lundberg & Woessner, P.A.

(57) ABSTRACT

An authentication engine, residing at one or more computing machines, receives, from a vision device comprising one or more cameras, a probe image. The authentication engine generates, using a trained facial classification neural engine, one or more first labels for a person depicted in the probe image and a probability for at least one of the one or more first labels. The authentication engine determines that the probability is within a predefined low accuracy range. The authentication engine generates, using a supporting engine, a second label for the person depicted in the probe image. The supporting engine operates independently of the trained facial classification neural engine. The authentication engine further trains the facial classification neural engine based on the second label.

20 Claims, 7 Drawing Sheets

(51) Int. Cl.
G06V 10/778 (2022.01)
G07C 9/37 (2020.01)
G06N 3/04 (2023.01)
G06V 40/16 (2022.01)
G06F 18/21 (2023.01)
G06F 18/214 (2023.01)
G06V 10/98 (2022.01)

(52) U.S. Cl.
CPC .......... G06F 18/2193 (2023.01); G06N 3/04 (2013.01); G06N 3/047 (2023.01); G06N 3/08 (2013.01); G06V 10/993 (2022.01); G06V 40/172 (2022.01); G07C 9/37 (2020.01)

(58) Field of Classification Search
CPC ............ G06N 3/02; G06N 20/00; G06N 7/01; G06N 3/047; G06K 9/00288; G06K 9/00295; G06K 9/00221; G06T 2207/20081; G06T 2207/30201
See application file for complete search history.

(56) References Cited

U.S. PATENT DOCUMENTS

| 2020/0019699 | A1* | 1/2020 | Araujo | G06N 3/08 |
| 2020/0104753 | A1* | 4/2020 | Demiralp | G06F 16/285 |
| 2020/0105111 | A1* | 4/2020 | Messer | G06K 9/00664 |

FOREIGN PATENT DOCUMENTS

| TW | 201636905 A | * | 10/2016 | ............ G06N 3/04 |
| WO | WO-2021042547 A1 | * | 3/2021 | |

OTHER PUBLICATIONS

Luo et al., Pedestrian tracking in surveillance video based on modified CNN, Feb. 7, 2018 [retrieved Dec. 13, 2021], Multimedia Tools and Applications, vol. 77, pp. 24041-24058. Retrieved: https://link.springer.com/article/10.1007/s11042-018-5728-8 (Year: 2018).*
Raut et al., Result Oriented Based Face Recognition using Neural Network with Erosion and Dilation Technique, Apr. 2015 [retrieved Dec. 13, 2021], International Journal on Recent and Innovation Trends in Computing and Communication, vol. 3 Issue:4, pp. 1821-1830. Retrieved: (Year: 2015) https://citeseerx.ist.psu.edu/viewdoc/download?doi=10.1.1.1056.1669&rep=rep1&type=pdf (Year: 2015).*
Madhuri et al., Pose-Robust Recognition of Low-Resolution Face Images, Feb. 2015 [retrieved Dec. 13, 2021], International Journal of Scientific Engineering and Technology Research, vol. 04, Issue.3, pp. 0523-0527. Retrieved: http://ijsetr.com/uploads/361524IJSETR4052-100.pdf (Year: 2015).*
Bhatt et al., Improving Cross-Resolution Face Matching Using Ensemble-Based Co-Transfer Learning, Oct. 9, 2014 [retrieved Dec. 13, 2021], IEEE Transactions on Image Processing, vol. 23, No. 12, pp. 5654-5669. Retrieved: https://ieeexplore.ieee.org/abstract/document/6919334 (Year: 2014).*
Ahonen et al., Recognition of blurred faces using Local Phase Quantization, Dec. 8-11, 2008 [retrieved Dec. 13, 2021], 2008 19th International Conference on Pattern Recognition, 4 pages. Retrieved: https://ieeexplore.ieee.org/abstract/document/4761847 (Year: 2008).*
Alba-Castro et al., Pattern Recognition: Progress, Direction and Applications: Audiovisual biometric verification, 2006 [retrieved Dec. 13, 2021], Computer Vision Center, Universitat Autonoma de Barcelona, 383 total pages: pertinent pp. 180-200. Retrieved: (Year: 2006) http://citeseerx.ist.psu.edu/viewdoc/download?doi=10.1.1.79.3610&rep=rep1&type=pdf#page=188 (Year: 2006).*
O'Toole et al., Face Space Representations in Deep Convolutional Neural Networks, Sep. 2018 [retrieved May 11, 2022], Trends in Cognitive Sciences, vol. 22, Issue 9,pp. 794-809. Retrieved: https://www.sciencedirect.com/science/article/pii/S1364661318301463 (Year: 2018).*
Machine translation: Behavior Identification Method, Device and Computer Readable Storage Medium (with examiner annotations) via Search of WO 2021/042547 A1 to Luo, retrieved Jul. 18, 2022, 26 pages. (Year: 2022).*
Machine translation:Neural Network and Method of Neural Network Training (with examiner annotation) via Search of TW 201636905 A to Pescianschi, retrieved Jul. 18, 2022, 40 pages. (Year: 2022).*
Chen et al., Group Consistent Similarity Learning via Deep CRF for Person Re-Identification, Jun. 18-23, 2018 [retrieved Jul. 18, 2022], 2018 IEEE/CVF Conference on Computer Vision and Pattern Recognition, pp. 8649-8658. Retrieved: https://ieeexplore.ieee.org/abstract/document/8579000 (Year: 2018).*
Best-Rowden et al., Unconstrained Face Recognition: Identifying a Person of Interest From a Media Collection, Sep. 19, 2014 [retrieved Jul. 18, 2022], IEEE Transaction on Information Forensics and Security, vol. 9, No. 12, pp. 2144-2157. Retrieved: https://ieeexplore.ieee.org/abstract/document/6905796 (Year: 2014).*
Search machine translation: A Personal Identification Method and Device Based on Multi-mode Biometric Identification Information of CN 107305624 A to Che, retrieved Mar. 10, 2023, 18 pages. (Year: 2023).*
Chopra et al., Learning a Similarity Metric Discriminatively, with Application to Face Verification, Jun. 20-25, 2005 [retrieved Mar. 10, 2023], 2005 IEEE Computer Society Conference on Computer Vision and Pattern Recognition (CVPR'05), 8 pages. Retrieved: (Year: 2005) https://ieeexplore.ieee.org/abstract/document/1467314 (Year: 2005)*
"International Application Serial No. PCT/EP2021/055288, International Search Report dated Jun. 8, 2021", 5 pgs.
"International Application Serial No. PCT/EP2021/055288, Written Opinion dated Jun. 8, 2021", 8 pgs.
Anonymous, "Apprentissage actif—Wikipedia", w/ English Machine Translation, [Online] Retrieved from the Internet: URL: https://fr.wikipedia.org/w/index.php?title=Apprentissage_actif&oldid=163636719#Echantillonnage_incertain_(Uncertainty_sampling)> [Retrieved on May 21, 2021], (Oct. 18, 2019), 13 pgs.
Hulsebosch, R J, "Enhancing Face Recognition with Location Information", IEEE 2008 Third International Conference on Availability, Reliability and Security, (Mar. 4, 2008), 397-403.
Kizhevsky, Alex, "ImageNet Classification with Deep Convolutional Neural Networks", author preprint, Advances in Neural Information Processing Systems 25 (NIPS 2012), 1097-1105, (2012), 9 pgs.
Lughofer, Edwin, "Hybrid active learning for reducing the annotation effort of operators in classification systems", Pattern Recognition, vol. 45, No. 2, [Online] Retrieved from the Internet: <URL: https://www.sciencedirect.com/science/article/abs/pii/S0167527316302789> [Retrieved on May 20, 2021], (Feb. 1, 2012), 884-896.
Tsai, Hsin-Chun, "Enhanced long-range personal identification based on multimodal information of human features", Multimedia Tools and Applications, vol. 73, No. 1, Kluwer Academic Publishers, Boston, USA, (Aug. 2, 2013), 291-307.
Park, Unsang, "Face Recognition in Video: Adaptive Fusion of Multiple Matchers", IEEE 2007 Conference on Computer Vision and Pattern Recognition, [Online] Retrieved from the Internet: <URL: https://dx.doi.org/10.1109/CVPR.2007.383378> [Retrieved on May 19, 2021], (Jun. 2007), 8 pgs.
Ye, Hao, "Face Recognition via Active Annotation and Learning", Proceedings of the 24th ACM International Conference on Multimedia (MM '16), (Oct. 2016), 1058-1062.
Zheng, Yaling, "Active Learning from Multiple Noisy Labelers with Varied Costs", IEEE 2010 International Conference on Data Mining, (Dec. 2010), 639-648.

* cited by examiner

SYSTEMS AND METHODS FOR FINE TUNING IMAGE CLASSIFICATION NEURAL NETWORKS

TECHNICAL FIELD

Embodiments pertain to computer architecture. Some embodiments relate to artificial neural networks. Some embodiments relate to systems and methods for fine tuning image classification neural networks.

BACKGROUND

Image classification technologies (e.g., facial classification technologies) have multiple use cases. Example use cases include allowing authorized persons (and disallowing unauthorized persons) to enter a secure physical location, authenticating a user of an electronic device or identifying an object (e.g., as a chair, a table, etc.). One problem with some implementations of image classification technology is a high rate of incorrect identification by a trained image classification neural network.

SUMMARY

Figure 1:
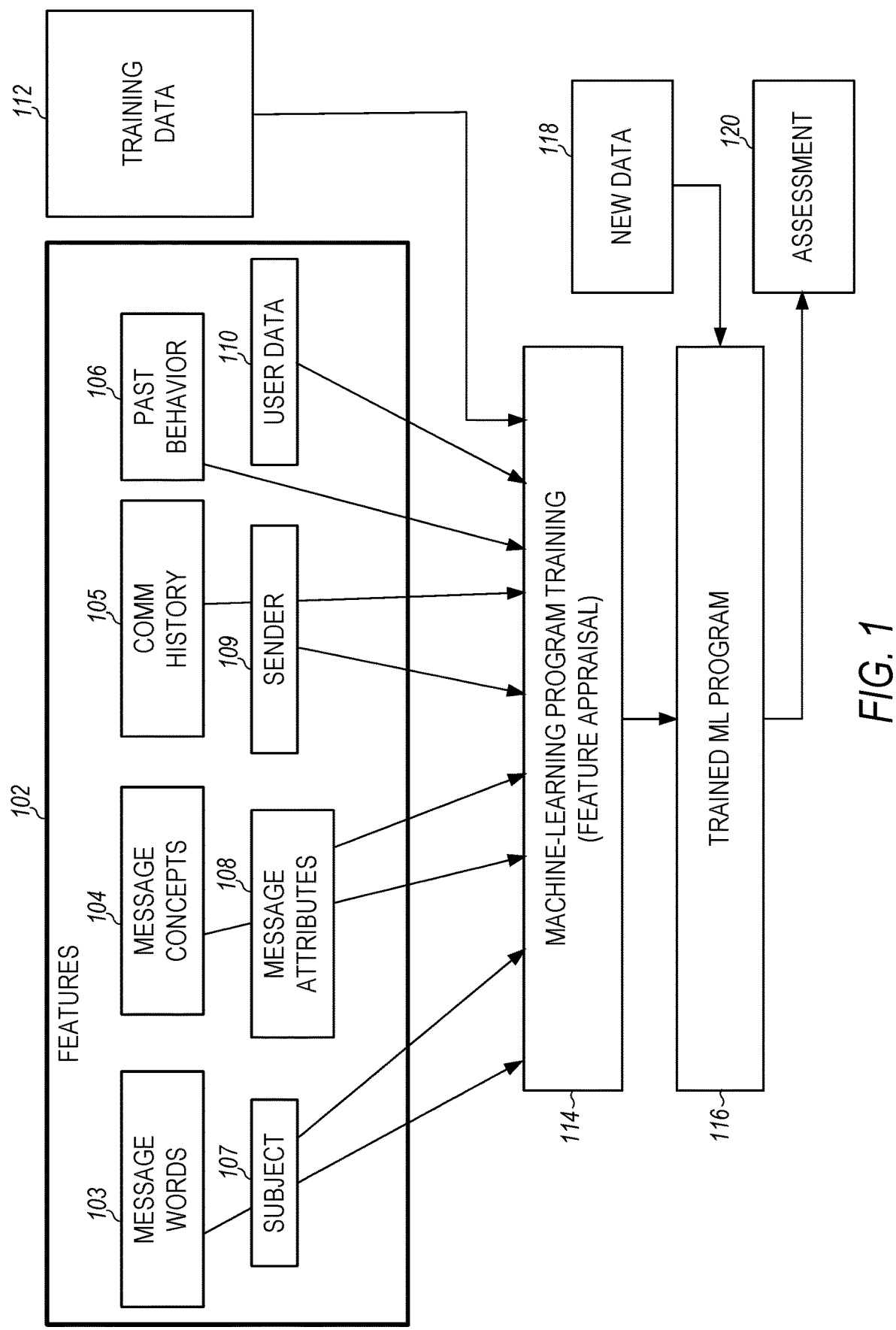
FIG. 1 illustrates the training and use of a machine-learning program, in accordance with some embodiments.

The present disclosure generally relates to systems and methods for fine tuning image classification neural networks.

According to some aspects of the technology described herein, a method comprises receiving, from a vision device comprising one or more cameras, a probe image. The method comprises generating, using a trained facial classification neural engine, one or more first labels for a person depicted in the probe image and a probability for at least one of the one or more first labels. The method comprises determining that the probability is within a predefined low accuracy range. The method comprises generating, using a supporting engine, a second label for the person depicted in the probe image, where the supporting engine operates independently of the trained facial classification neural engine. The method comprises further training the facial classification neural engine based on the second label.

In some embodiments, the method further comprises: using the further trained facial classification neural engine to identify one or more persons in visual data from the vision device; and based on the identified one or more persons in the visual data, controlling access to a physical location or an electronic resource.

In some embodiments, generating, using the supporting engine, the second label for the person depicted in the probe image comprises: generating the second label based on an identity card or token provided by the person or based on a user identifier and password entered by the person.

In some embodiments, generating, using the supporting engine, the second label for the person depicted in the probe image comprises: generating the second label based on a combination of weak authentication factors, the weak authentication factors comprising one or more of: a height, a weight and a gait.

In some embodiments, generating, using the supporting engine, the second label for the person depicted in the probe image comprises: verifying, via at least one client computing device, a correct identification for the person depicted in the probe image.

In some embodiments, verifying the correct identification comprises: providing, for display at the at least one client computing device, the probe image and a plurality of possible identifications for the person; and receiving, from the at least one client device, a selection of one of the possible identifications as the correct identification.

In some embodiments, the at least one client computing device comprises an administrator client computing device and N employee client computing devices. N is a positive integer greater than or equal to two. Verifying the correct identification comprises: providing the probe image to at least a portion of the N employee client computing devices; upon receiving, from at least M employee client computing devices, a consistent identification of the person: verifying that the consistent identification is the correct identification, where M is a positive integer between half of N and N; and upon failing to receive, from the at least M employee client computing devices, the consistent identification of the person: providing the probe image to the administrator client computing device for verifying the correct identification via the administrator client computing device.

In some embodiments, the employee client computing devices are selected based on a corporate department or an office geographic location of at least one of the plurality of possible identifications.

In some embodiments, generating, using the supporting engine, the second label for the person depicted in the probe image comprises: providing the probe image to a training dataset for a semi-supervised learning facial classification engine; training the semi-supervised learning facial classification engine using the training dataset; generating, using the semi-supervised learning facial classification engine, the second label for the person depicted in the probe image and a probability value for the second label; and adjusting the trained facial classification neural engine based on the trained semi-supervised learning facial classification engine.

In some embodiments, providing the probe image to the training dataset for the semi-supervised learning facial classification engine is in response to determining that a quality of the probe image exceeds a quality threshold.

In some embodiments, the quality of the probe image is computed using a quality measuring neural engine.

In some embodiments, the quality of the probe image comprises a blurriness of the probe image.

In some embodiments, generating, using the supporting engine, the second label for the person depicted in the probe image further comprises: determining that the probability value for the second label is below a probability threshold;

and in response to the probability value for the second label being below the probability threshold: verifying, via at least one client computing device, a correct identification for the person depicted in the probe image.

In some embodiments, the probe image is one of a plurality of images that track the person, the plurality of images being received from the vision device. Generating, using the supporting engine, the second label for the person depicted in the probe image comprises: determining, using the trained facial classification neural engine, that at least a threshold number of the plurality of images have a specified identification with a probability within a predefined high accuracy range; and determining that the probe image has the specified identification based on the at least the threshold number of the plurality of images having the specified identification.

In some embodiments, the method further comprises: identifying the plurality of images that track the person based on timestamps associated with the plurality of images and a physical position of the person within a space depicted in the plurality of images.

Other aspects include a machine-readable medium storing instructions to perform one or more of the above methods and a system comprising processing circuitry and memory, the memory storing instructions which, when executed by the processing circuitry, cause the processing circuitry to perform one or more of the above methods.

Advantageously, some embodiments may provide, among other things, a higher level of assurance using face recognition networks. Some embodiments may reduce the rate of incorrect identification by the trained image classification neural network.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

As discussed above, image classification technologies (e.g., facial classification technologies) have multiple use cases. Example use cases include allowing authorized persons (and disallowing unauthorized persons) to enter a secure physical location, authenticating a user of an electronic device or identifying an object (e.g., as a chair, a table, etc.). One problem with some implementations of image classification technology is a high rate of incorrect identification by a trained image classification neural network. To achieve a high level of security assurance when using facial recognition based authentication, techniques for reducing the rate of incorrect identification by the trained image classification neural network are highly desirable.

Some embodiments provide a technical solution to a technical problem. According to some embodiments, the technical problem is reducing incorrect identification by a facial classification neural engine after the initial training of the facial classification neural engine is completed. The technical solution includes an authentication engine (which may execute at a server or at an edge device, for example, a vision device) receiving, from a vision device comprising one or more cameras, a probe image. The authentication engine generates, using the trained facial classification neural engine, one or more first labels for a person depicted in the probe image and a probability for at least one of the one or more first labels. The authentication engine determines that the probability is within a predefined low accuracy range (e.g., between 50% and 90%). The authentication engine generates, using a supporting engine, a second label for the person depicted in the probe image. The supporting engine operates independently of the trained facial classification neural engine. The authentication engine further trains the facial classification neural engine based on the second label.

According to some embodiments, the authentication engine is initially trained at the server. The trained authentication engine is then provided to edge devices, including the vision device. During the inference phase, the trained authentication engine executes at the vision device. According to other embodiments, the authentication engine resides at the server during both the training and inference phases. According to other embodiments, the authentication engine resides at the vision device during both the training and the inference phases.

In some embodiments, the authentication engine uses the further trained facial classification neural engine to identify one or more persons in visual data from the vision device. Based on the identified one or more persons in the visual data, the authentication engine controls access to a physical location or an electronic resource.

According to some aspects, the authentication engine generates the second label based on an identity card or token provided by the person or based on a user identifier and password entered by the person. According to some aspects, the authentication engine generates the second label by verifying, via at least one client computing device (e.g., a laptop computer or mobile phone belonging to an administrator, a security officer or a colleague of the possibly depicted person(s)), a correct identification for the person depicted in the probe image. The probe image may be displayed at the client computing device and a user (typically an admin or security officer or verified colleagues of the person under verification) of the client computing device may provide the correct identification if he/she knows the person depicted in the probe image.

In some aspects, the authentication engine generates the second label by providing the probe image to a training dataset for a semi-supervised learning facial classification engine. (The semi-supervised learning facial classification engine is separate and distinct from the facial classification engine.) The authentication engine trains the semi-supervised learning facial classification engine using the training dataset. The authentication engine generates, using the semi-supervised learning facial classification engine, the second label for the person depicted in the probe image and a probability value for the second label. If the probability value of second label generated by the semi-supervised learning facial classification engine is acceptable then the authentication engine adjusts the trained facial classification neural engine using the probe image and its label provided by the trained semi-supervised learning facial classification engine.

In some aspects, the probe image is one of a plurality of images that track the person. The plurality of images are received from the vision device. The authentication engine generates the second label by determining, using the trained facial classification neural engine, that at least a threshold number of the plurality of images (e.g., at least five images or at least 60% of the images) have a specified identification with a probability within a predefined high accuracy range (e.g., at least 90%). The authentication engine determines that the probe image has the specified identification based on the at least the threshold number of the plurality of images having the specified identification.

As used herein, the term "identification" encompasses its plain and ordinary meaning. Among other things, the term "identification" may refer to an artificial neural network (ANN) identifying a facial image as belonging to a specified person (e.g., "Barack Obama," "George Bush," "Bill Clinton," and the like). The facial image may then be labeled with the identification. For example, a bounding box may be placed around a face and the label "Barack Obama" may be placed on the bounding box. The label may correspond to an identification of the thing depicted in the bounding box. In the inference phase, the label is generated by the ANN. In the training phase of a supervised learning engine, human-generated labels (or labels generated by another machine learning engine) are provided to the untrained or partially-trained ANN in order for the ANN to train itself to generate labels, as described herein, for example, in conjunction with FIGS. 1-4.

A supervised image classification network training system uses a dataset of images. This dataset includes pairs, where each pair includes an image and its associated label. This label acts as an identifier of the person to whom the image belongs. During the inference phase, an authentication system receives only an image (typically called a probe image) and its task is to predict the associated label. In order to do so, the authentication system makes use of the trained classification network. The classification network then provides the identifier/label along with information on how certain it is about the identifier. The certainty is typically expressed using probability.

Some aspects are directed to making use of probe image to further train the classification network. Some aspects leverage the associated label/identifier. Some embodiments include various techniques to be more certain about the label/identifier associated with the probe image.

In some embodiments, a person identification comprises of his/her image with an associated identifier typically called a label. In supervised machine learning, one trains a facial recognition network using images with their corresponding labels. During the inference phase, an authentication engine receives, from a vision device comprising one or more cameras, a probe image. The authentication engine generates, using a trained facial classification neural engine, one or more first labels for a person depicted in the probe image and a probability for at least one of the one or more first labels. The authentication engine then determines that the probability is within a predefined low accuracy range. The authentication engine then generates, using a supporting engine, a second label for the person depicted in the probe image. The supporting engine(s) operates independently of the trained facial classification neural engine. The authentication engine further trains the facial classification neural engine based on the second label.

Aspects of the systems and methods described herein may be implemented as part of a computer system. The computer system may be one physical machine, or may be distributed among multiple physical machines, such as by role or function, or by process thread in the case of a cloud computing distributed model. In various embodiments, aspects of the systems and methods described herein may be configured to run on desktop computers, embedded devices, mobile phones, physical server machines and in virtual machines that in turn are executed on one or more physical machines. It will be understood that features of the systems and methods described herein may be realized by a variety of different suitable machine implementations.

The system includes various engines, each of which is constructed, programmed, configured, or otherwise adapted, to carry out a function or set of functions. The term engine as used herein means a tangible device, component, or arrangement of components implemented using hardware, such as by an application specific integrated circuit (ASIC) or field-programmable gate array (FPGA), for example, or as a combination of hardware and software, such as by a processor-based computing platform and a set of program instructions that transform the computing platform into a special-purpose device to implement the particular functionality. An engine may also be implemented as a combination of the two, with certain functions facilitated by hardware alone, and other functions facilitated by a combination of hardware and software.

In an example, the software may reside in executable or non-executable form on a tangible machine-readable storage medium. Software residing in non-executable form may be compiled, translated, or otherwise converted to an executable form prior to, or during, runtime. In an example, the software, when executed by the underlying hardware of the engine, causes the hardware to perform the specified operations. Accordingly, an engine is physically constructed, or specifically configured (e.g., hardwired), or temporarily configured (e.g., programmed) to operate in a specified manner or to perform part or all of any operations described herein in connection with that engine.

Considering examples in which engines are temporarily configured, each of the engines may be instantiated at different moments in time. For example, where the engines comprise a general-purpose hardware processor core configured using software; the general-purpose hardware processor core may be configured as respective different engines at different times. Software may accordingly configure a hardware processor core, for example, to constitute a particular engine at one instance of time and to constitute a different engine at a different instance of time.

In certain implementations, at least a portion, and in some cases, all, of an engine may be executed on the processor(s) of one or more computers that execute an operating system, system programs, and application programs, while also implementing the engine using multitasking, multithreading, distributed (e.g., cluster, peer-peer, cloud, etc.) processing where appropriate, or other such techniques. Accordingly, each engine may be realized in a variety of suitable configurations, and should generally not be limited to any particular implementation exemplified herein, unless such limitations are expressly called out.

In addition, an engine may itself be composed of more than one sub-engines, each of which may be regarded as an engine in its own right. Moreover, in the embodiments described herein, each of the various engines corresponds to a defined functionality. However, it should be understood that in other contemplated embodiments, each functionality may be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

As used herein, the term "convolutional neural network" or "CNN" may refer, among other things, to a neural network that is comprised of one or more convolutional layers (often with a subsampling operation) and then followed by one or more fully connected layers as in a standard multilayer neural network. In some cases, the architecture of a CNN is designed to take advantage of the 2D structure of an input image (or other 2D input such as a speech signal). This is achieved with local connections and tied weights followed by some form of pooling which results in translation invariant features. In some cases, CNNs are easier to train and have many fewer parameters than fully connected networks with the same number of hidden units. In some embodiments, a CNN includes multiple hidden layers and, therefore, may be referred to as a deep neural network (DNN). CNNs are generally described in "ImageNet Classification with Deep Convolutional Neural Networks," part of "Advances in Neural Information Processing Systems 25" (NIPS 2012) by Alex Krizhevsky, Ilya Sutskever, and Geoffrey E. Hinton, available at: papers.nips.cc/paper/4824-imagenet-classification-with-deep-convolutional-neural-networ, last visited 28 Aug. 2019, the entire content of which is incorporated herein by reference.

As used herein, the phrase "computing machine" encompasses its plain and ordinary meaning. A computing machine may include, among other things, a single machine with a processor and a memory or multiple machines that have access to one or more processors or one or more memories, sequentially or in parallel. A server may be a computing machine. A client device may be a computing machine. A data repository may be a computing machine.

Throughout this document, some method(s) (e.g., in FIG. 8) are described as being implemented serially and in a given order. However, unless explicitly stated otherwise, the operations of the method(s) may be performed in any order. In some cases, two or more operations of the method(s) may be performed in parallel using any known parallel processing techniques. In some cases, some of the operation(s) may be skipped and/or replaced with other operations. Furthermore, skilled persons in the relevant art may recognize other operation(s) that may be performed in conjunction with the operation(s) of the method(s) disclosed herein.

FIG. 1 illustrates the training and use of a machine-learning program, according to some example embodiments. In some example embodiments, machine-learning programs (MLPs), also referred to as machine-learning algorithms or tools, are utilized to perform operations associated with machine learning tasks, such as image recognition or machine translation.

Machine learning (ML) is a field of study that gives computers the ability to learn without being explicitly programmed. Machine learning explores the study and construction of algorithms, also referred to herein as tools, which may learn from existing data and make predictions about new data. Such machine-learning tools operate by building a model from example training data 112 in order to make data-driven predictions or decisions expressed as outputs or assessments 120. Although example embodiments are presented with respect to a few machine-learning tools, the principles presented herein may be applied to other machine-learning tools.

In some example embodiments, different machine-learning tools may be used. For example, Logistic Regression (LR), Naive-Bayes, Random Forest (RF), neural networks (NN), matrix factorization, and Support Vector Machines (SVM) tools may be used for classifying or scoring job postings.

Two common types of problems in machine learning are classification problems and regression problems. Classification problems, also referred to as categorization problems, aim at classifying items into one of several category values (for example, is this object an apple or an orange). Regression algorithms aim at quantifying some items (for example, by providing a value that is a real number). The machine-learning algorithms utilize the training data 112 to find correlations among identified features 102 that affect the outcome.

The machine-learning algorithms utilize features 102 for analyzing the data to generate assessments 120. A feature 102 is an individual measurable property of a phenomenon being observed. The concept of a feature is related to that of an explanatory variable used in statistical techniques such as linear regression. Choosing informative, discriminating, and independent features is important for effective operation of the MLP in pattern recognition, classification, and regression. Features may be of different types, such as numeric features, strings, and graphs.

In one example embodiment, the features 102 may be of different types and may include one or more of words of the message 103, message concepts 104, communication history 105, past user behavior 106, subject of the message 107, other message attributes 108, sender 109, and user data 110.

The machine-learning algorithms utilize the training data 112 to find correlations among the identified features 102 that affect the outcome or assessment 120. In some example embodiments, the training data 112 includes labeled data, which is known data for one or more identified features 102 and one or more outcomes, such as detecting communication patterns, detecting the meaning of the message, generating a summary of the message, detecting action items in the message, detecting urgency in the message, detecting a relationship of the user to the sender, calculating score attributes, calculating message scores, etc.

With the training data 112 and the identified features 102, the machine-learning tool is trained at operation 114. The machine-learning tool appraises the value of the features 102 as they correlate to the training data 112. The result of the training is the trained machine-learning program 116.

When the machine-learning program 116 is used to perform an assessment, new data 118 is provided as an input to the trained machine-learning program 116, and the machine-learning program 116 generates the assessment 120 as output. For example, when a message is checked for an action item, the machine-learning program utilizes the message content and message metadata to determine if there is a request for an action in the message.

Machine learning techniques train models to accurately make predictions on data fed into the models (e.g., what was said by a user in a given utterance; whether a noun is a person, place, or thing; what the weather will be like tomorrow). During a learning phase, the models are developed against a training dataset of inputs to optimize the models to correctly predict the output for a given input. Generally, the learning phase may be supervised, semi-supervised, or unsupervised; indicating a decreasing level to which the "correct" outputs are provided in correspondence to the training inputs. In a supervised learning phase, all of the outputs are provided to the model and the model is directed to develop a general rule or algorithm that maps the input to the output. In contrast, in an unsupervised learning phase, the desired output is not provided for the inputs so that the model may develop its own rules to discover relationships within the training dataset. In a semi-supervised learning phase, an incompletely labeled training set is provided, with some of the outputs known and some unknown for the training dataset.

Models may be run against a training dataset for several epochs (e.g., iterations), in which the training dataset is repeatedly fed into the model to refine its results. For example, in a supervised learning phase, a model is developed to predict the output for a given set of inputs and is evaluated over several epochs to more reliably provide the output that is specified as corresponding to the given input for the greatest number of inputs for the training dataset. In another example, for an unsupervised learning phase, a model is developed to cluster the dataset into n groups and is evaluated over several epochs as to how consistently it places a given input into a given group and how reliably it produces the n desired clusters across each epoch.

Once an epoch is run, the models are evaluated and the values of their variables are adjusted to attempt to better refine the model in an iterative fashion. In various aspects, the evaluations are biased against false negatives, biased against false positives, or evenly biased with respect to the overall accuracy of the model. The values may be adjusted in several ways depending on the machine learning technique used. For example, in a genetic or evolutionary algorithm, the values for the models that are most successful in predicting the desired outputs are used to develop values for models to use during the subsequent epoch, which may include random variation/mutation to provide additional data points. One of ordinary skill in the art will be familiar with several other machine learning algorithms that may be applied with the present disclosure, including linear regression, random forests, decision tree learning, neural networks, deep neural networks, etc.

Each model develops a rule or algorithm over several epochs by varying the values of one or more variables affecting the inputs to more closely map to a desired result, but as the training dataset may be varied, and is preferably very large, perfect accuracy and precision may not be achievable. A number of epochs that make up a learning phase, therefore, may be set as a given number of trials or a fixed time/computing budget, or may be terminated before that number/budget is reached when the accuracy of a given model is high enough or low enough or an accuracy plateau has been reached. For example, if the training phase is designed to run n epochs and produce a model with at least 95% accuracy, and such a model is produced before the $n^{th}$ epoch, the learning phase may end early and use the produced model satisfying the end-goal accuracy threshold. Similarly, if a given model is inaccurate enough to satisfy a random chance threshold (e.g., the model is only 55% accurate in determining true/false outputs for given inputs), the learning phase for that model may be terminated early, although other models in the learning phase may continue training. Similarly, when a given model continues to provide similar accuracy or vacillate in its results across multiple epochs—having reached a performance plateau—the learning phase for the given model may terminate before the epoch number/computing budget is reached.

Once the learning phase is complete, the models are finalized. In some example embodiments, models that are finalized are evaluated against testing criteria. In a first example, a testing dataset that includes known outputs for its inputs is fed into the finalized models to determine an accuracy of the model in handling data that it has not been trained on. In a second example, a false positive rate or false negative rate may be used to evaluate the models after finalization. In a third example, a delineation between data clusterings is used to select a model that produces the clearest bounds for its clusters of data.

Figure 2:
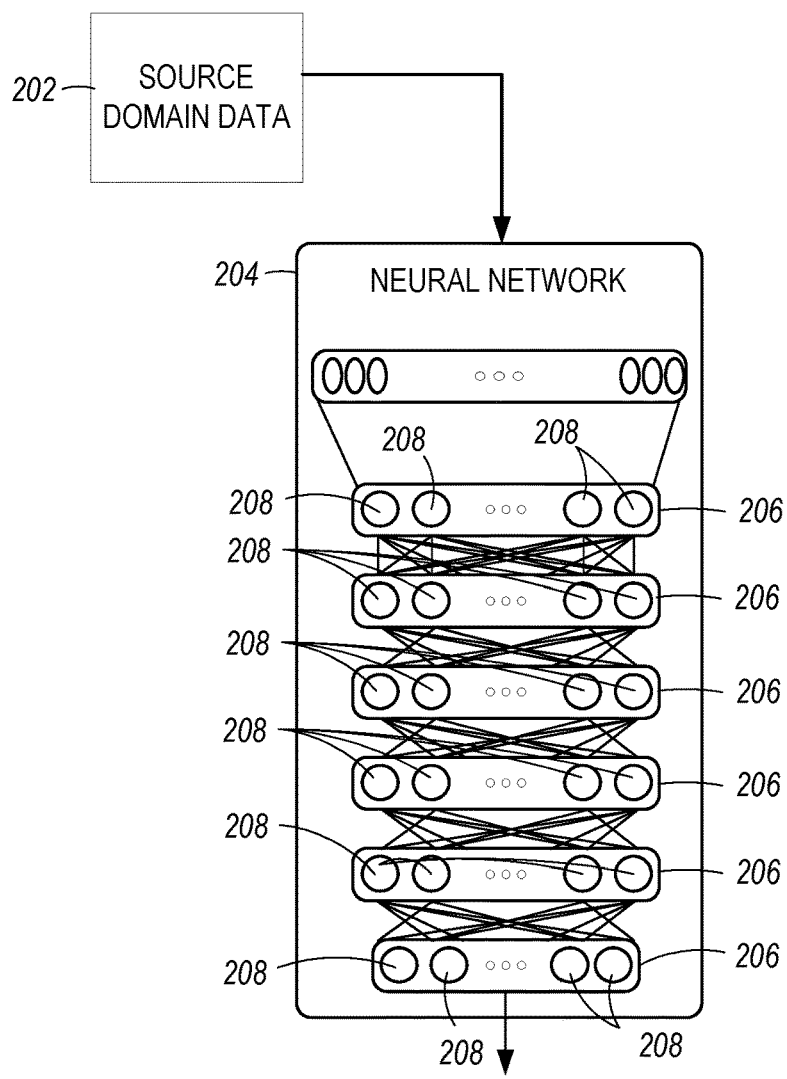
FIG. 2 illustrates an example neural network, in accordance with some embodiments.
Figure 2:
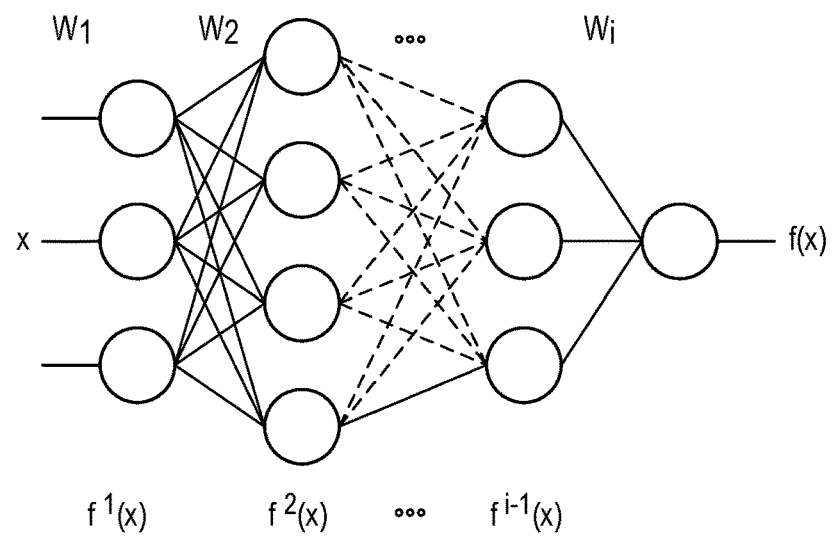

FIG. 2 illustrates an example neural network 204, in accordance with some embodiments. As shown, the neural network 204 receives, as input, source domain data 202. The input is passed through a plurality of layers 206 to arrive at an output. Each layer 206 includes multiple neurons 208. The neurons 208 receive input from neurons of a previous layer and apply weights to the values received from those neurons in order to generate a neuron output. The neuron outputs from the final layer 206 are combined to generate the output of the neural network 204.

As illustrated at the bottom of FIG. 2, the input is a vector x. The input is passed through multiple layers 206, where weights $W_1$, $W_2$, . . . , $W_i$ are applied to the input to each layer to arrive at $f^1(x)$, $f^2(x)$, . . . , $f^{i-1}(x)$, until finally the output f(x) is computed. The weights are established (or adjusted) through learning and training of the network. As shown, each of the weights $W_1$, $W_2$, . . . , $W_i$ is a vector. However, in some embodiments, each of the weights may be a scalar.

Neural networks utilize features for analyzing the data to generate assessments (e.g., recognize units of speech). A feature is an individual measurable property of a phenomenon being observed. The concept of feature is related to that of an explanatory variable used in statistical techniques such as linear regression. Further, deep features represent the output of nodes in hidden layers of the deep neural network.

A neural network, sometimes referred to as an artificial neural network, is a computing system/apparatus based on consideration of neural networks of biological brains. Such systems/apparatus progressively improve performance, which is referred to as learning, to perform tasks, typically without task-specific programming. For example, in image recognition, a neural network may be taught to identify images that contain an object by analyzing example images that have been tagged with a name for the object and, having learned the object and name, may use the analytic results to identify the object in untagged images. A neural network is based on a collection of connected units called neurons, where each connection, called a synapse, between neurons can transmit a unidirectional signal with an activating strength (e.g., a weight as shown in FIG. 2) that varies with the strength of the connection. The weight applied for the output of a first neuron at the input of a second neuron may correspond to the activating strength. The receiving neuron can activate and propagate a signal to downstream neurons connected to it, typically based on whether the combined incoming signals, which are from potentially many transmitting neurons, are of sufficient strength, where strength is a parameter.

A deep neural network (DNN) is a stacked neural network, which is composed of multiple layers. The layers are composed of nodes, which are locations where computation occurs, loosely patterned on a neuron in the biological brain, which fires when it encounters sufficient stimuli. A node combines input from the data with a set of coefficients, or weights, that either amplify or dampen that input, which assigns significance to inputs for the task the algorithm is trying to learn. These input-weight products are summed, and the sum is passed through what is called a node's activation function, to determine whether and to what extent that signal progresses further through the network to affect the ultimate outcome. A DNN uses a cascade of many layers of non-linear processing units for feature extraction and transformation. Each successive layer uses the output from the previous layer as input. Higher-level features are derived from lower-level features to form a hierarchical representation. The layers following the input layer may be convolution layers that produce feature maps that are filtering results of the inputs and are used by the next convolution layer.

In training of a DNN architecture, a regression, which is structured as a set of statistical processes for estimating the relationships among variables, can include a minimization of a cost function. The cost function may be implemented as a function to return a number representing how well the neural network performed in mapping training examples to correct output. In training, if the cost function value is not within a pre-determined range, based on the known training images, backpropagation is used, where backpropagation is a common method of training artificial neural networks that are used with an optimization method such as a stochastic gradient descent (SGD) method.

Use of backpropagation can include propagation and weight update. When an input is presented to the neural network, it is propagated forward through the neural network, layer by layer, until it reaches the output layer. The output of the neural network is then compared to the desired output, using the cost function, and an error value is calculated for each of the nodes in the output layer. The error values are propagated backwards, starting from the output, until each node has an associated error value which roughly represents its contribution to the original output. Backpropagation can use these error values to calculate the gradient of the cost function with respect to the weights in the neural network. The calculated gradient is fed to the selected optimization method to update the weights to attempt to minimize the cost function.

Figure 3:
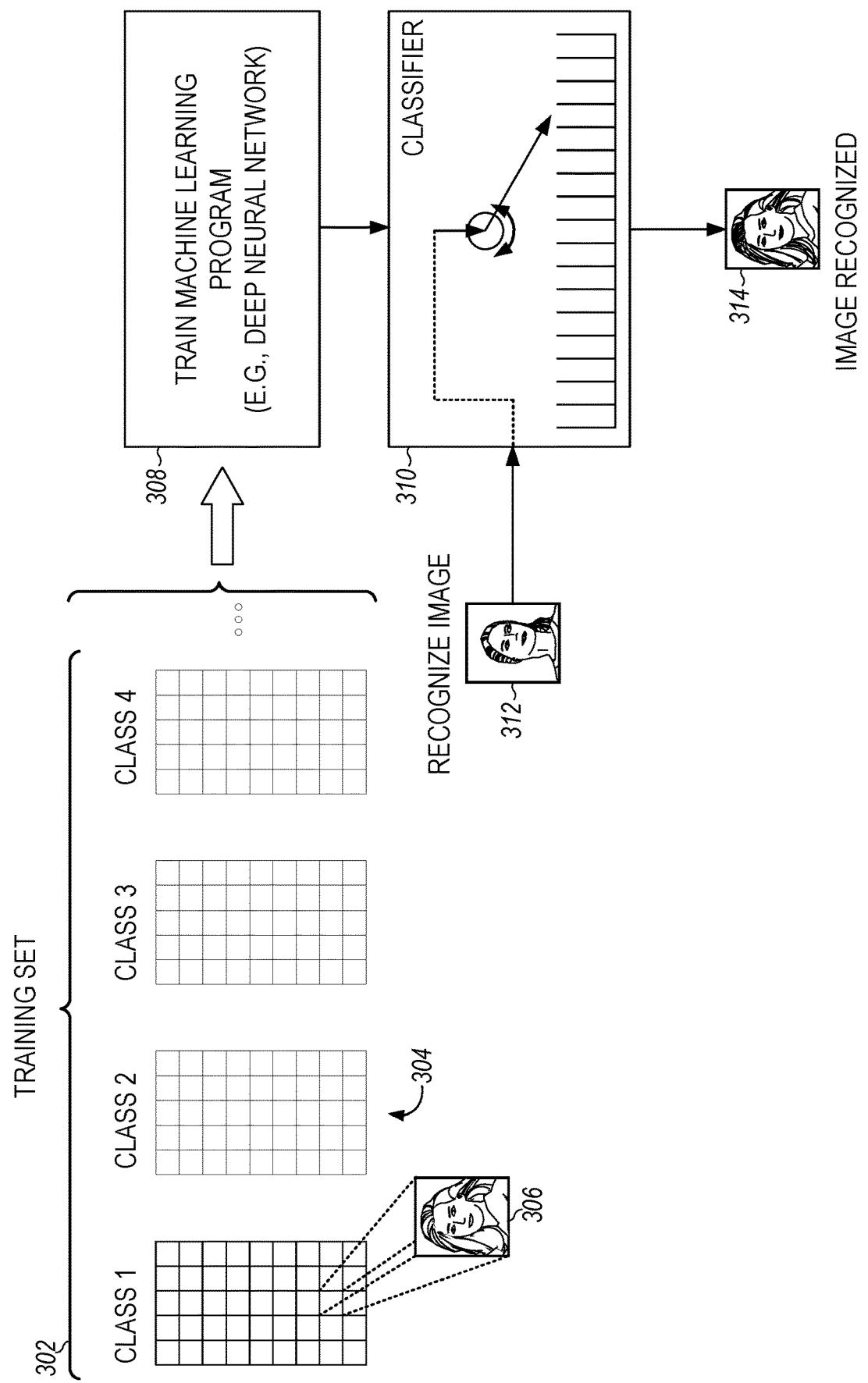
FIG. 3 illustrates the training of an image recognition machine learning program, in accordance with some embodiments.

FIG. 3 illustrates the training of an image recognition machine learning program, in accordance with some embodiments. The machine learning program may be implemented at one or more computing machines. Block 302 illustrates a training set, which includes multiple classes 304. Each class 304 includes multiple images 306 associated with the class. Each class 304 may correspond to a type of object in the image 306 (e.g., a digit 0-9, a man or a woman, a cat or a dog, etc.). In one example, the machine learning program is trained to recognize images of the presidents of the United States, and each class corresponds to each president (e.g., one class corresponds to Barack Obama, one class corresponds to George W. Bush, one class corresponds to Bill Clinton, etc.). At block 308 the machine learning program is trained, for example, using a deep neural network. At block 310, the trained classifier, generated by the training of block 308, recognizes an image 312, and at block 314 the image is recognized. For example, if the image 312 is a photograph of Bill Clinton, the classifier recognizes the image as corresponding to Bill Clinton at block 314.

FIG. 3 illustrates the training of a classifier, according to some example embodiments. A machine learning algorithm is designed for recognizing faces, and a training set 302 includes data that maps a sample to a class 304 (e.g., a class includes all the images of purses). The classes may also be referred to as labels. Although embodiments presented herein are presented with reference to object recognition, the same principles may be applied to train machine-learning programs used for recognizing any type of items.

The training set 302 includes a plurality of images 306 for each class 304 (e.g., image 306), and each image is associated with one of the categories to be recognized (e.g., a class). The machine learning program is trained 308 with the training data to generate a classifier 310 operable to recognize images. In some example embodiments, the machine learning program is a DNN.

When an input image 312 is to be recognized, the classifier 310 analyzes the input image 312 to identify the class (e.g., class 314) corresponding to the input image 312.

Figure 4:
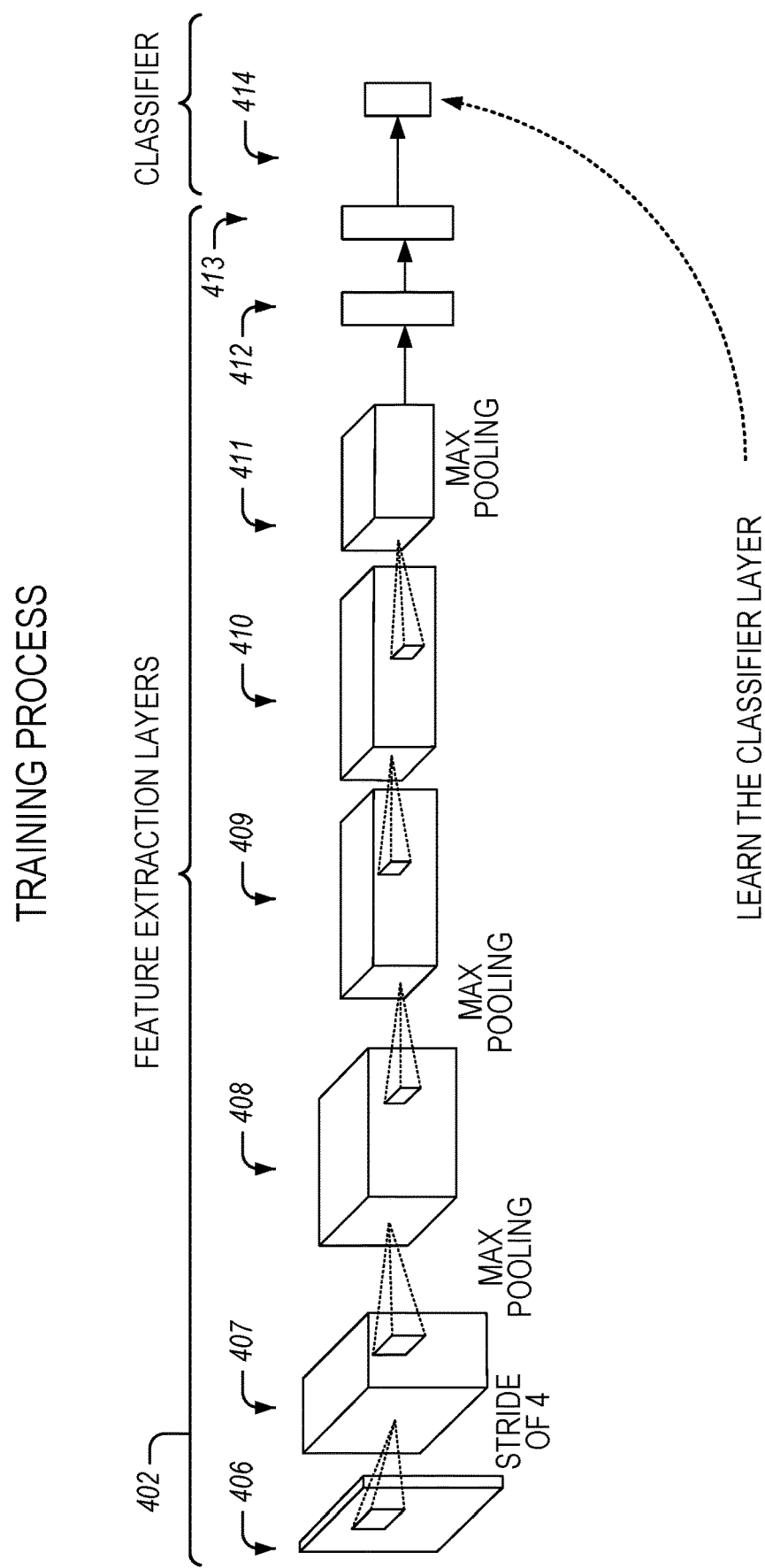
FIG. 4 illustrates the feature-extraction process and classifier training, in accordance with some embodiments.

FIG. 4 illustrates the feature-extraction process and classifier training, according to some example embodiments. Training the classifier may be divided into feature extraction layers 402 and classifier layer 414. Each image is analyzed in sequence by a plurality of layers 406-413 in the feature-extraction layers 402.

With the development of deep convolutional neural networks, the focus in face recognition has been to learn a good face feature space, in which faces of the same person are close to each other and faces of different persons are far away from each other. For example, the verification task with the LFW (Labeled Faces in the Wild) dataset has been often used for face verification.

Many face identification tasks (e.g., MegaFace and LFW) are based on a similarity comparison between the images in the gallery set and the query set, which is essentially a K-nearest-neighborhood (KNN) method to estimate the person's identity. In the ideal case, there is a good face feature extractor (inter-class distance is always larger than the intra-class distance), and the KNN method is adequate to estimate the person's identity.

Feature extraction is a process to reduce the amount of resources required to describe a large set of data. When performing analysis of complex data, one of the major problems stems from the number of variables involved. Analysis with a large number of variables generally requires a large amount of memory and computational power, and it may cause a classification algorithm to overfit to training samples and generalize poorly to new samples. Feature extraction is a general term describing methods of constructing combinations of variables to get around these large data-set problems while still describing the data with sufficient accuracy for the desired purpose.

In some example embodiments, feature extraction starts from an initial set of measured data and builds derived values (features) intended to be informative and non-redundant, facilitating the subsequent learning and generalization operations. Further, feature extraction is related to dimensionality reduction, such as reducing large vectors (sometimes with very sparse data) to smaller vectors capturing the same, or similar, amount of information.

Determining a subset of the initial features is called feature selection. The selected features are expected to contain the relevant information from the input data, so that the desired task can be performed by using this reduced representation instead of the complete initial data. DNN utilizes a stack of layers, where each layer performs a function. For example, the layer could be a convolution, a non-linear transform, the calculation of an average, etc. Eventually this DNN produces outputs by classifier 414. In FIG. 4, the data travels from left to right and the features are extracted. The goal of training the neural network is to find the weights for all the layers that make them adequate for the desired task.

As shown in FIG. 4, a "stride of 4" filter is applied at layer 406, and max pooling is applied at layers 407-413. The stride controls how the filter convolves around the input volume. "Stride of 4" refers to the filter convolving around the input volume four units at a time. Max pooling refers to down-sampling by selecting the maximum value in each max pooled region.

In some example embodiments, the structure of each layer is predefined. For example, a convolution layer may contain small convolution kernels and their respective convolution parameters, and a summation layer may calculate the sum, or the weighted sum, of two pixels of the input image. Training assists in defining the weight coefficients for the summation.

One way to improve the performance of DNNs is to identify newer structures for the feature-extraction layers, and another way is by improving the way the weights are identified at the different layers for accomplishing a desired task. The challenge is that for a typical neural network, there may be millions of weights to be optimized. Trying to optimize all these weights from scratch may take hours, days, or even weeks, depending on the amount of computing resources available and the amount of data in the training set.

Figure 5:
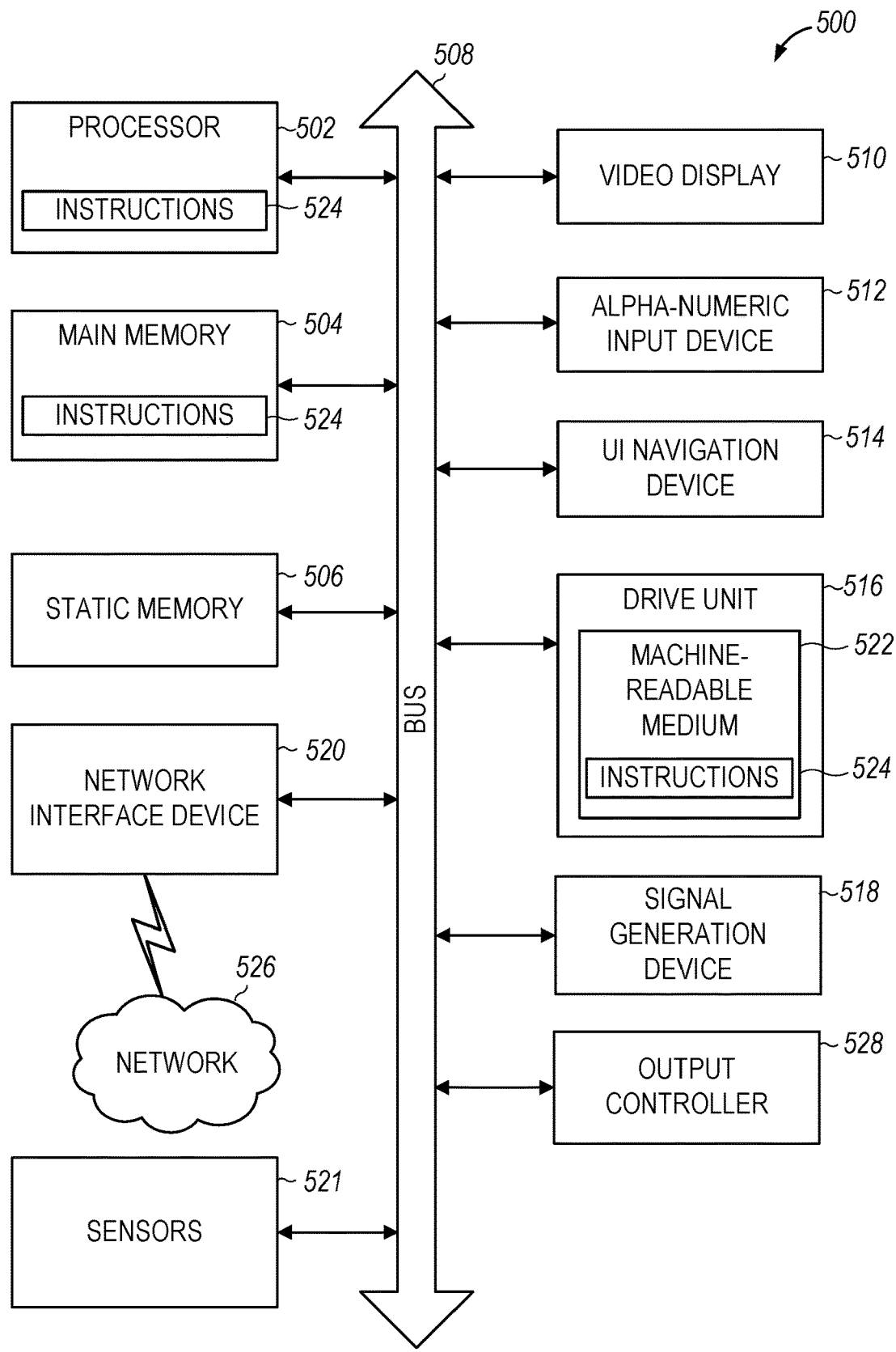
FIG. 5 is a block diagram of a computing machine, in accordance with some embodiments.

FIG. 5 illustrates a circuit block diagram of a computing machine 500 in accordance with some embodiments. In some embodiments, components of the computing machine 500 may store or be integrated into other components shown in the circuit block diagram of FIG. 5. For example, portions of the computing machine 500 may reside in the processor 502 and may be referred to as "processing circuitry." Processing circuitry may include processing hardware, for example, one or more central processing units (CPUs), one or more graphics processing units (GPUs), and the like. In alternative embodiments, the computing machine 500 may operate as a standalone device or may be connected (e.g., networked) to other computers. In a networked deployment, the computing machine 500 may operate in the capacity of a server, a client, or both in server-client network environments. In an example, the computing machine 500 may act as a peer machine in peer-to-peer (P2P) (or other distributed) network environment. In this document, the phrases P2P, device-to-device (D2D) and sidelink may be used interchangeably. The computing machine 500 may be a specialized computer, a personal computer (PC), a tablet PC, a personal digital assistant (PDA), a mobile telephone, a smart phone, a web appliance, a network router, switch or bridge, or any machine capable of executing instructions (sequential or otherwise) that specify actions to be taken by that machine.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems/apparatus (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The computing machine 500 may include a hardware processor 502 (e.g., a central processing unit (CPU), a GPU, a hardware processor core, or any combination thereof), a main memory 504 and a static memory 506, some or all of which may communicate with each other via an interlink (e.g., bus) 508. Although not shown, the main memory 504 may contain any or all of removable storage and non-removable storage, volatile memory or non-volatile memory. The computing machine 500 may further include a video display unit 510 (or other display unit), an alphanumeric input device 512 (e.g., a keyboard), and a user interface (UI) navigation device 514 (e.g., a mouse). In an example, the display unit 510, input device 512 and UI navigation device 514 may be a touch screen display. The computing machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensor. The computing machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The drive unit 516 (e.g., a storage device) may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the computing machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the computing machine 500 and that cause the computing machine 500 to perform any one or more of the techniques of the present disclosure, or that is capable of storing, encoding or carrying data structures used by or associated with such instructions. Non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine-readable media. In some examples, machine readable media may include machine readable media that is not a transitory propagating signal.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 520 may include one or more physical jacks (e.g., Ethernet, coaxial, or phone jacks) or one or more antennas to connect to the communications network 526.

Figure 6:
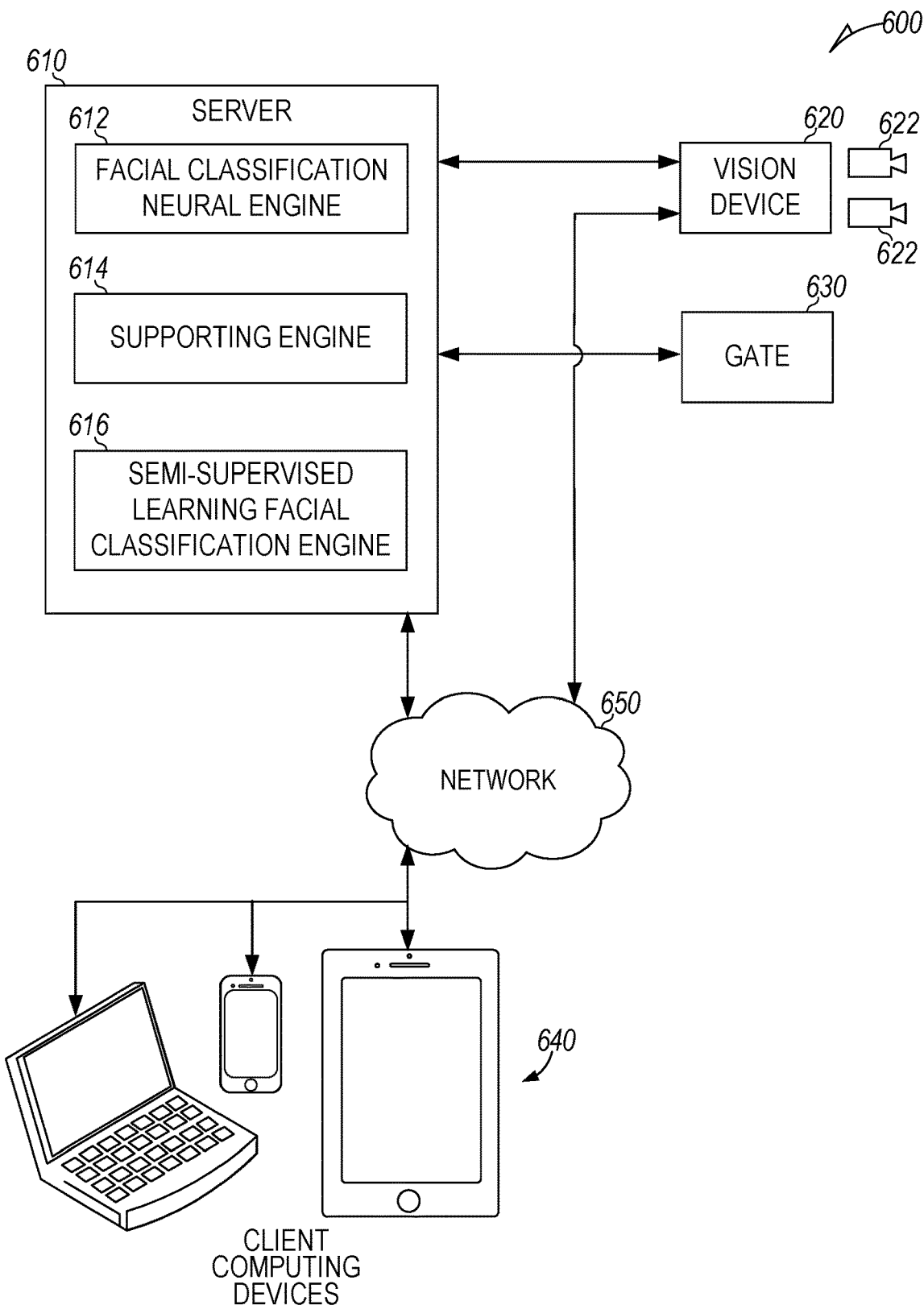
FIG. 6 illustrates an example system for fine tuning a facial classification neural engine, in accordance with some embodiments.

FIG. 6 illustrates an example system 600 for fine tuning a facial classification neural engine 612, in accordance with some embodiments. As shown, the system 600 includes a server 610, a vision device 620, a gate 630, and client computing devices 640. The server 610, the vision device 620, and the client computing devices 640 are connected to a network 650. The server 610 is also directly connected to the vision device 620 and the gate 630. One or more of the server 610, the vision device 620, and the client computing devices 640 may include one or more components of the computing machine 500.

The network 650 may include one or more of a local area network, a wide area network, a cellular network, a WiFi® network, a virtual private network (VPN), the Internet, an intranet, and the like. The client computing devices 640 may include one or more of a mobile phone, a smartphone, a tablet computer, a laptop computer, a desktop computer, and the like. Each client computing device 640 may include one or more of the components of the computing machine 500. The vision device 620 may be a computing device (e.g., including one or more of the components of the computing machine 500) that is coupled with or includes one or more cameras 622. The camera(s) 622 may capture visual data (e.g., probe image(s)) for processing via the vision device 620 and/or the server 610. The gate 630 may be controlled (e.g., opened or closed) based on the processing of the visual data at the server 610 and/or the vision device 620. In one example, the gate 630 is a gate to an office building, and the gate is opened when the server 610 or the vision device 620 determines that a worker from the office building is within a field-of-view of the camera(s) 622.

The camera(s) 622 may include a camera that includes a wideband imager (red, green, blue, and infrared) and/or a camera that detects wavelength longer than 600 nm (orange, red, and infrared). In some aspects, at least one of the cameras 622 may be webcam configured for video calling to assist information technology (IT) personnel in remotely servicing a geographic area proximate to the cameras 622.

As shown, the server 610 includes the facial classification neural engine 612, a supporting engine 614, and a semi-supervised learning facial classification engine 616. The facial classification neural engine 612, the supporting engine 614, and the semi-supervised learning facial classification engine 616 are separate and distinct engines. In some embodiments, the engines 612, 614, and 616 may reside at the server 610 during the training phase. After the training is completed, one or more of the engines 612, 614, and 616 may be provided to the vision device 620 (or another edge device) for inference thereat.

In some embodiments, an authentication engine at the server 610 or the vision device 620 receives, from the vision device 620 comprising the camera(s) 622, a probe image. The authentication engine generates, using the trained facial classification neural engine 612, one or more first labels for a person depicted in the probe image and a probability for at least one of the one or more first labels. The authentication engine determines that the probability is within a predefined low accuracy range (e.g., between 50% and 90%). The server 610 generates, using the supporting engine 614, a second label for the person depicted in the probe image. The supporting engine 614 operates independently of the trained facial classification neural engine 612. The server 610 further trains the facial classification neural engine 612 based on the second label.

In some embodiments, to generate the second label, the supporting engine 614 provides the probe image to a training dataset for the semi-supervised learning facial classification engine 616. The authentication engine trains the semi-supervised learning facial classification engine 616 using the training dataset. The server 610 generates, using the semi-supervised learning facial classification engine 616, the second label for the person depicted in the probe image and a probability value for the second label. The authentication engine adjusts the trained facial classification neural engine 612 based on the trained semi-supervised learning facial classification engine 616.

The authentication engine may reside at the server 610, the vision device 620 or at another edge device. In some embodiments, the authentication engine resides in the firmware of the camera(s) 622 or the vision device 620 coupled with the camera(s) 622. Alternatively, the authentication engine may reside at the server 610. In some embodiments, one or more of the engines 612, 614, and 616 is initially trained at the server 610, then provided to the vision device 620 (or to another edge device) fore inference thereat.

Figure 7:
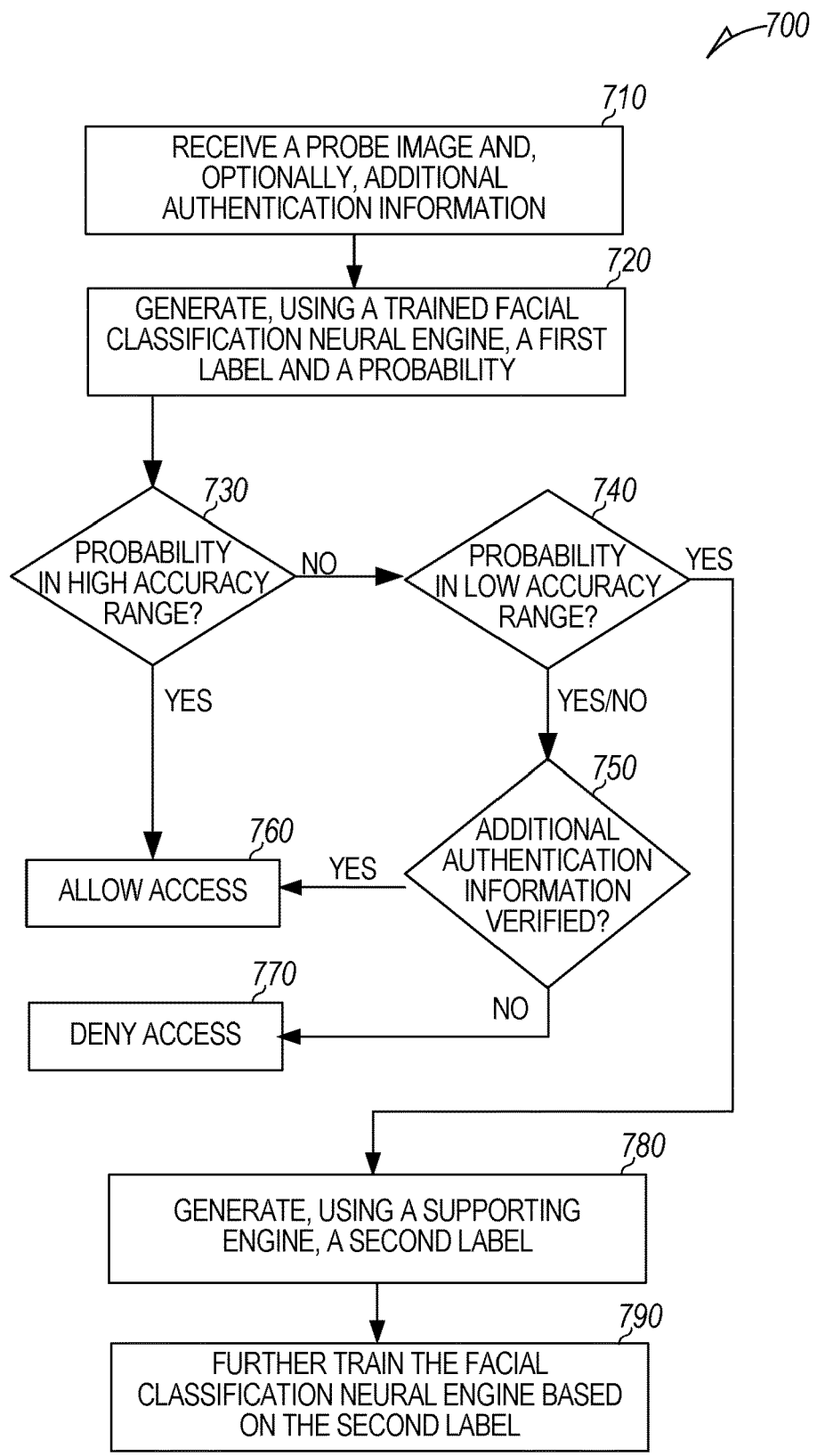
FIG. 7 is a flow chart illustrating an example method for fine tuning a facial classification neural engine, in accordance with some embodiments.

FIG. 7 is a flow chart illustrating an example method 700 for fine tuning the facial classification neural engine 612, in accordance with some embodiments. As described below, the method 700 may be performed at an authentication engine, which may reside at the server 610 or the vision device 620, working in conjunction with the other machines shown in FIG. 6. Alternatively, one or more other machines may be used to perform one or more operations of the method 700.

At operation 710, the authentication engine receives, from the vision device 620 comprising one or more cameras 622, a probe image. Optionally, additional authentication information (e.g., a username and password combination, a scan of an employee identification card, a near-field communication (NFC) scan of a key card or a mobile phone, and the like) may be received together with the probe image.

At operation 720, the authentication engine generates, using the trained facial classification neural engine 612, one or more first labels for a person depicted in the probe image and a probability for at least one of the one or more first labels. The facial classification neural engine 612 may be trained, for example, using the techniques described herein in conjunction with FIGS. 1-4.

At operation 730, the authentication engine determines whether the probability (or the highest probability, if there are multiple probabilities) is in a high accuracy range. The high accuracy range and the low accuracy range may be predefined. In one example, the high accuracy range is greater than 95%, and the low accuracy range is between 55% and 95%. If the probability is in the high accuracy range, the method 700 continues to operation 760. If the probability is not in the high accuracy range, the method 700 continues to operation 740.

At operation 740, the authentication engine determines whether the probability is in the low accuracy range. If so, the method 700 continues to operation 780. Regardless of whether the probability is in the low accuracy range, the method 700 continues to operation 750.

At operation 750, the authentication engine determines whether the additional authentication information is verified (e.g., to be associated with an authorized person). If so, the method 700 continues to operation 760. If not, the method 700 continues to operation 770.

At operation 760, in response to determining that the probability is in the high accuracy range or that the additional authentication information is verified, the authentication engine transmits, to the gate 630, a control signal to allow access (e.g., to open the gate 630).

At operation 770, upon determining that the authentication information is not verified, the authentication engine transmits, to the gate 630, a control signal to deny access. Alternatively, no signal might be transmitted, and the gate 630 might remain closed.

At operation 780, in response to determining that the probability is in the low accuracy range, the authentication engine generates, using the supporting engine 614, a second label for the person depicted in the probe image. The supporting engine 614 operates independently of the facial classification neural engine 612. The authentication engine may generate the second label using any technique, including but not limited to one or a combination of the techniques described below.

According to a first technique, the authentication engine generates the second label based on an identity card or token provided by the person or based on a user identifier and password entered by the person. The authentication engine may generate the second label based on a combination of weak authentication factors. The weak authentication factors may include one or more of: a height, a weight, and a gait. The height may be measured using the authentication engine based on data received from the vision device 620 (e.g., the camera(s) 622 of the vision device 620). The weight may be measured via a scale on which the person steps. The gait may be recorded in a video feed via the camera(s) 622, and a neural network engine may be used to associate the gait with a specific person.

According to a second technique, the authentication engine generates the second label by transmitting the probe image to one or multiple client computing devices 640 and verifying, via the one or multiple client computing devices 640, a correct identification for the person depicted in the probe image. In some examples, the authentication engine provides, for display at the client computing device(s) 640, the probe image and a plurality of possible identifications for the person. The possible identifications of the person may be the highest probability identifications generated by the facial classification neural engine 612. The authentication engine receives, from at least one of the client computing device(s) 640, a selection of one of the possible identifications as the correct identification.

In some examples, a single client computing device 640 belonging to a security officer or an administrator is used. In some examples, the client computing devices 640 include an administrator client computing device and N employee client computing devices, where N is a positive integer greater than or equal to two. To verify the correct identification, the authentication engine provides the probe image to at least a portion of the N employee client computing devices. Upon receiving, from at least M employee client computing devices, a consistent identification of the person: the authentication engine verifies that the consistent identification is the correct identification, where M is a positive integer between half of N and N. Upon failing to receive, from the at least M employee client computing devices, the consistent identification of the person: the authentication engine provides the probe image to the administrator client computing device for verifying the correct identification via the administrator client computing device. In some cases, the employee client computing devices may be selected based on a corporate department or an office geographic location of at least one of the plurality of possible identifications. As a result, the second label may be generated without contacting the administrator or with minimal effort on the administrator's part.

According to a third technique, the authentication engine generates the second label by providing the probe image to a training dataset for the semi-supervised learning facial classification engine 616. The authentication engine trains the semi-supervised learning facial classification engine 616 using the training dataset. The authentication engine generates, using the semi-supervised learning facial classification engine 616, the second label for the person depicted in the probe image and a probability value for the second label. The authentication engine adjusts the trained facial classification neural engine 612 based on the trained semi-supervised learning facial classification engine 616. In some cases, if, after adjusting the trained facial classification neural engine 612 based on the trained semi-supervised learning facial classification engine 616, the probability value for the second label is still below a probability threshold (e.g., 65%), the authentication engine verifies, via at least one client computing device 640, (e.g., using the second technique described above) a correct identification for the person depicted in the probe image.

In some cases, the authentication engine provides the probe image to the training dataset for the semi-supervised learning facial classification engine 616 in response to determining that a quality of the probe image exceeds a quality threshold. The quality of the probe image may be computed using a quality measuring neural engine. The quality of the probe image may include the blurriness of the probe image. The quality of the probe image may be computed based, at least in part, on the blurriness of the probe image.

According to a fourth technique, the probe image is one of a plurality of images, received from the vision device 620, that track the person (e.g., while the person is walking through a turnstile or a similar space). The authentication engine generates the second label by determining, using the trained facial classification neural engine 612, that at least a threshold number of the plurality of images (e.g., at least 50% of the plurality of images or at least five images) have a specified identification with a probability within a predefined high accuracy range (e.g., greater than 96%). The authentication engine determines that the probe image has the specified identification based on the at least the threshold number of the plurality of images having the specified identification. In some cases, the authentication engine identifies the plurality of images that track the person based on timestamps associated with the plurality of images and a physical position of the person within a space depicted in the plurality of images.

At operation 790, the authentication engine further trains the facial classification neural engine 612 based on the second label. In some embodiments, the authentication engine uses the further trained facial classification neural engine 612 to identify one or more persons in visual data received from the vision device 620 via the camera(s) 622. Based on the identified one or more persons in the visual data, the authentication engine controls access to a physical location or an electronic resource. The access may be controlled via the gate 630.

One purpose of classification machine learning algorithms and neural networks is to classify the provided input into one of the classes. For example, there may be four types of flowers and given some properties (i.e., features) about a given flower, (e.g., petal length, petal width, septal length, and septal width) a classification engine may output the flower type (i.e., class).

The same strategy as mentioned in above example (at a much bigger scale) may be used for the task of face recognition. Here, the input data includes images and one problem is to classify these images belonging to some classes (e.g., a given person).

For a machine learning engine to learn to classify it may implement a training phase. In the training phase, the engine is shown many examples of the input data along with the corresponding label. The training phase includes multiple iterations (often taking weeks and months for sophisticated tasks) where the engine, using the input data and the corresponding labels, learns to find the patterns (i.e., latent information or representations) that it then uses to classify new examples of the input data. One main goal of a machine learning engine may be to learn the patterns in the data that it is shown.

Based on above description, that the accuracy of classification may depend on one or more of the following aspects of the training: (i) number of input data examples (images in the context of face recognition) per class (person) shown to the machine learning engine; (ii) variations in the input data examples per class shown to the machine learning engine, for example, in the case of face recognition it might be desirable to show it face images that have varying degree of poses. The face pose means that some pictures are frontal and while others have a varying degree of yaw, pitch and roll.

While the aspects of using large amount of data as well as the variations are well understood, there may be challenges to make an effective use of a trained neural network in an industrial setting. In some cases, the labelled input examples are not available. While there are techniques to re-purpose the network for new classes it might lose some accuracy. For example, during the training phase some aspects may use 1000 classes to train but the engine might benefit from using the learning (patterns) for 200 classes that were not part of the training phase. There are schemes such as transfer learning, representation learning, and the like. However, these schemes may involve a loss in accuracy. Even if there is a large number of examples available, the labeled variational data especially in the case face recognition is hard to obtain. As discussed above the variational data could be about pose of the face or change in appearance because of makeup, clothing, facial hair, face expression, age, and the like.

The challenges mentioned above concern the accuracy of the classification task, which is seen as the quality and variation of the input data (images) supplied during the training phase. However, the aspect of security may also be considered. In some cases, a few modifications to the input data may fool the neural network, causing it to generate an incorrect result. In some cases, the few modifications are not perceptible to a typical human viewer, yet the input data is misclassified by the neural network. These types of input data are called adversarial examples.

The misclassification of these types of examples (i.e. adversarial examples) by machine learning algorithms is an intensive research area. One theory states that, during the training phase, the neural network engine was not shown enough variations of data. Even though for a human eye the input data is same it was different enough for the machine learning algorithm. One approach is to generate these adversarial examples (based on the current state of art in understanding of this subject) and feed them during the training phase.

While one may show as much possible variation of input data to the machine learning engine during the training phase, there is still no assurance that it would not be susceptible to attacks during the inference phase. One way to address this problem is to update the algorithm (or rather the patterns that it has learned) by showing more examples that it receives during the inference phase. This may be referred to as online learning. That said, a machine learning engine (at least in the supervised setting) may be built based on only the input data but also the "correct" label associated with the input data. One challenge is how to correctly assign a label to the image seen during the inference phase.

Some embodiments are directed to systems and methods that can used to select the images to be used for online learning along with their respective labels.

As used herein, a classifier may include a machine learning engine to classify input data. Fine tuning or online learning may refer to updating of a machine learning engine with new input data. Probe image(s) may include image(s) shown during the inference phase.

A first approach includes utilization of secondary authentication factors to label the misclassified images. In some cases, additional authentication factors may be coupled with a facial recognition engine in case the facial recognition engine fails (as most facial recognition engines are not 100% reliable). For example, a person may be authenticated using more factors. For example, the person may be carrying a cryptographic card or token or may know a secret phrase/password. In some cases, prior knowledge about behavior such as arrival time, or a combination of weak authentication factors such as height, weight, gait, and the like may be used.

This approach makes use of the secondary and/or auxiliary authentication factors to label the images that were misclassified by the classifier. These misclassified images are passed as input to software modules that check the quality of the images and if they pass a certain quality threshold check are selected for re-training or fine-tuning of the classification networks. The label is assumed to be the one that is generated with the help of secondary authentication factors.

A second approach uses security officers and colleagues in an enterprise to label the misclassified images. The classification engines emit a probability associated with the result. In case of ambiguity they end up specifying almost equal weightage to all the classes on which they were trained. A policy maker can also specify a certain threshold (of probability) to the decision-making function software or hardware. This approach may include collecting the images belonging to these types of events, i.e., where the engine is not sure about the classification result and using humans to intervene and assign the appropriate label.

An example workflow may include (i) neural engine uploads the probe images (that it could not correctly classify) along with their respective probabilities, and (ii) the probe images are shown to a human classifier to verify the identity. The human classifier may be a security officer, an administrator, or an employee who works in the same branch, department, or location as the highest probability person(s) identified by the neural engine in the probe image. The labels provided by the human classifier(s) are used to fine tune the neural engine.

A third approach includes using semi-supervised techniques for label propagation. Misclassified probe images may be then be fed into a semi-supervised learning engine for label propagation. These approaches further act as one more layer to potentially reduce human or machine error.

A fourth approach includes utilization of face tracking data to label misclassified images. In some cases, a face recognition classifier is used after detecting and tracking a human face. Some approaches can be used to track a moving object (human face in this case) resulting into multiple images with varying pose and quality.

All or a portion of the images that are collected after performing face tracking are fed to the face recognition networks and classifiers. If the classifier ends up misclassifying some of these images (for example, there are five images that were generated as a result of tracking and four of them are classified as Person A, while one could not be classified) then these images can be considered for further inspection. The inspection could be to automatically consider the misclassified image as being of Person A, and use this information for fine-tuning the classifier and/or it could be sent to a security officer and/or colleagues of Person A, as described above.

Some aspects are described below as numbered examples (Example 1, 2, 3, etc.). These numbered examples do not limit the technology disclosed herein.

Example 1 is a system comprising: processing circuitry; and a memory storing instructions which, when executed by the processing circuitry, cause the processing circuitry to perform operations comprising: receiving, from a vision device comprising one or more cameras, a probe image; generating, using a trained facial classification neural engine, one or more first labels for a person depicted in the probe image and a probability for at least one of the one or more first labels; determining that the probability is within a predefined low accuracy range; generating, using a supporting engine, a second label for the person depicted in the probe image, wherein the supporting engine operates independently of the trained facial classification neural engine; further training the facial classification neural engine based on the second label.

In Example 2, the subject matter of Example 1 includes, the operations further comprising: using the further trained facial classification neural engine to identify one or more persons in visual data from the vision device; and based on the identified one or more persons in the visual data, controlling access to a physical location or an electronic resource.

In Example 3, the subject matter of Examples 1-2 includes, wherein generating, using the supporting engine, the second label for the person depicted in the probe image comprises: generating the second label based on an identity card or token provided by the person or based on a user identifier and password entered by the person.

In Example 4, the subject matter of Examples 1-3 includes, wherein generating, using the supporting engine, the second label for the person depicted in the probe image comprises: generating the second label based on a combination of weak authentication factors, the weak authentication factors comprising one or more of: a height, a weight and a gait.

In Example 5, the subject matter of Examples 1-4 includes, wherein generating, using the supporting engine, the second label for the person depicted in the probe image comprises: verifying, via at least one client computing device, a correct identification for the person depicted in the probe image.

In Example 6, the subject matter of Example 5 includes, wherein verifying the correct identification comprises: providing, for display at the at least one client computing device, the probe image and a plurality of possible identifications for the person; and receiving, from the at least one client device, a selection of one of the possible identifications as the correct identification.

In Example 7, the subject matter of Examples 5-6 includes, wherein the at least one client computing device comprises an administrator client computing device and N employee client computing devices, wherein N is a positive integer greater than or equal to two, wherein verifying the correct identification comprises: providing the probe image to at least a portion of the N employee client computing devices; upon receiving, from at least M employee client computing devices, a consistent identification of the person: verifying that the consistent identification is the correct identification, wherein M is a positive integer between half of N and N; and upon failing to receive, from the at least M employee client computing devices, the consistent identification of the person: providing the probe image to the administrator client computing device for verifying the correct identification via the administrator client computing device.

In Example 8, the subject matter of Example 7 includes, wherein the employee client computing devices are selected based on a corporate department or an office geographic location of at least one of the plurality of possible identifications.

In Example 9, the subject matter of Examples 1-8 includes, wherein generating, using the supporting engine, the second label for the person depicted in the probe image comprises: providing the probe image to a training dataset for a semi-supervised learning facial classification engine; training the semi-supervised learning facial classification engine using the training dataset; generating, using the semi-supervised learning facial classification engine, the second label for the person depicted in the probe image and a probability value for the second label; and adjusting the trained facial classification neural engine based on the trained semi-supervised learning facial classification engine.

In Example 10, the subject matter of Example 9 includes, wherein providing the probe image to the training dataset for the semi-supervised learning facial classification engine is in response to determining that a quality of the probe image exceeds a quality threshold.

In Example 11, the subject matter of Example 10 includes, wherein the quality of the probe image is computed using a quality measuring neural engine.

In Example 12, the subject matter of Examples 10-11 includes, wherein the quality of the probe image comprises a blurriness of the probe image.

In Example 13, the subject matter of Examples 9-12 includes, wherein generating, using the supporting engine, the second label for the person depicted in the probe image further comprises: determining that the probability value for the second label is below a probability threshold; and in response to the probability value for the second label being below the probability threshold: verifying, via at least one client computing device, a correct identification for the person depicted in the probe image.

In Example 14, the subject matter of Examples 1-13 includes, wherein the probe image is one of a plurality of images that track the person, the plurality of images being received from the vision device, wherein generating, using the supporting engine, the second label for the person depicted in the probe image comprises: determining, using the trained facial classification neural engine, that at least a threshold number of the plurality of images have a specified identification with a probability within a predefined high accuracy range; and determining that the probe image has the specified identification based on the at least the threshold number of the plurality of images having the specified identification.

In Example 15, the subject matter of Example 14 includes, the operations further comprising identifying the plurality of images that track the person based on timestamps associated with the plurality of images and a physical position of the person within a space depicted in the plurality of images.

Example 16 is a machine-readable medium (e.g., non-transitory machine-readable medium) storing instructions which, when executed by processing circuitry of one or more computing machines, cause the processing circuitry to perform operations comprising: receiving, from a vision device comprising one or more cameras, a probe image; generating, using a trained facial classification neural engine, one or more first labels for a person depicted in the probe image and a probability for at least one of the one or more first labels; determining that the probability is within a predefined low accuracy range; generating, using a supporting engine, a second label for the person depicted in the probe image, wherein the supporting engine operates independently of the trained facial classification neural engine; further training the facial classification neural engine based on the second label.

In Example 17, the subject matter of Example 16 includes, the operations further comprising: using the further trained facial classification neural engine to identify one or more persons in visual data from the vision device; and based on the identified one or more persons in the visual data, controlling access to a physical location or an electronic resource.

In Example 18, the subject matter of Examples 16-17 includes, wherein generating, using the supporting engine, the second label for the person depicted in the probe image comprises: providing the probe image to a training dataset for a semi-supervised learning facial classification engine; training the semi-supervised learning facial classification engine using the training dataset; generating, using the semi-supervised learning facial classification engine, the second label for the person depicted in the probe image and a probability value for the second label; and adjusting the trained facial classification neural engine based on the trained semi-supervised learning facial classification engine.

In Example 19, the subject matter of Examples 16-18 includes, wherein the probe image is one of a plurality of images that track the person, the plurality of images being received from the vision device, wherein generating, using the supporting engine, the second label for the person depicted in the probe image comprises: determining, using the trained facial classification neural engine, that at least a threshold number of the plurality of images have a specified identification with a probability within a predefined high accuracy range; and determining that the probe image has the specified identification based on the at least the threshold number of the plurality of images having the specified identification.

Example 20 is a method comprising: receiving, from a vision device comprising one or more cameras, a probe image; generating, using a trained facial classification neural engine, one or more first labels for a person depicted in the probe image and a probability for at least one of the one or more first labels; determining that the probability is within a predefined low accuracy range; generating, using a supporting engine, a second label for the person depicted in the probe image, wherein the supporting engine operates independently of the trained facial classification neural engine; further training the facial classification neural engine based on the second label.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, user equipment (UE), article, composition, formulation, or process that includes elements in addition to those listed after such a term in a claim are still deemed to fall within the scope of that claim.

Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A system comprising:
processing circuitry; and
a memory storing instructions which, when executed by the processing circuitry, cause the processing circuitry to perform operations comprising:
receiving, from a vision device comprising one or more cameras, a probe image;
generating, using a trained facial classification neural engine, a first label for a person depicted in the probe image, the first label acting as an identifier of the person, and generating a probability for the first label, the probability corresponding to a confidence that the first label accurately identifies the person;
determining whether the probability is within a predefined high accuracy range;
if the probability is within the predefined high accuracy range, allowing access by the person to a physical location or an electronic resource; and
if the probability is not within the predefined high accuracy range:
allowing or denying access by the person to the physical location or electronic resource based on additional authentication information provided by the person; and
determining whether the probability is within a predefined low accuracy range, and if so:
generating, using a supporting engine, a second label for the person depicted in the probe image, the second label acting as an identifier of the person, wherein the supporting engine operates independently of the trained facial classification neural engine; and
further training the facial classification neural engine based on the second label.

2. The system of claim 1, the operations further comprising:
using the further trained facial classification neural engine to identify one or more persons in visual data from the vision device; and
based on the identified one or more persons in the visual data, controlling access to the physical location or electronic resource for the one or more persons.

3. The system of claim 1, wherein generating, using the supporting engine, the second label for the person depicted in the probe image comprises:
generating the second label based on an identity card or token provided by the person or based on a user identifier and password entered by the person.

4. The system of claim 1, wherein generating, using the supporting engine, the second label for the person depicted in the probe image comprises:
generating the second label based on a combination of weak authentication factors, the weak authentication factors comprising one or more of: a height, a weight and a gait.

5. The system of claim 1, wherein generating, using the supporting engine, the second label for the person depicted in the probe image comprises:
verifying, via at least one client computing device, a correct identification for the person depicted in the probe image.

6. The system of claim 5, wherein verifying the correct identification comprises:
providing, for display at the at least one client computing device, the probe image and a plurality of possible identifications for the person; and
receiving, from the at least one client device, a selection of one of the possible identifications as the correct identification.

7. The system of claim 5, wherein the at least one client computing device comprises an administrator client computing device and N employee client computing devices, wherein N is a positive integer greater than or equal to two, wherein verifying the correct identification comprises:
providing the probe image to at least a portion of the N employee client computing devices;
upon receiving, from at least M employee client computing devices, a consistent identification of the person: verifying that the consistent identification is the correct identification, wherein M is a positive integer between half of N and N; and
upon failing to receive, from the at least M employee client computing devices, the consistent identification of the person: providing the probe image to the administrator client computing device for verifying the correct identification via the administrator client computing device.

8. The system of claim 7, wherein the N employee client computing devices are selected based on a corporate department or an office geographic location of at least one of a plurality of possible identifications.

9. The system of claim 1, wherein generating, using the supporting engine, the second label for the person depicted in the probe image comprises:
providing the probe image to a training dataset for a semi-supervised learning facial classification engine;
training the semi-supervised learning facial classification engine using the training dataset;
generating, using the semi-supervised learning facial classification engine, the second label for the person depicted in the probe image and a probability value for the second label; and
adjusting the trained facial classification neural engine based on the trained semi-supervised learning facial classification engine.

10. The system of claim 9, wherein providing the probe image to the training dataset for the semi-supervised learning facial classification engine is in response to determining that a quality of the probe image exceeds a quality threshold.

11. The system of claim 10, wherein the quality of the probe image is computed using a quality measuring neural engine.

12. The system of claim 10, wherein the quality of the probe image comprises a blurriness of the probe image.

13. The system of claim 9, wherein generating, using the supporting engine, the second label for the person depicted in the probe image further comprises:
determining that the probability value for the second label is below a probability threshold; and
in response to the probability value for the second label being below the probability threshold: verifying, via at least one client computing device, a correct identification for the person depicted in the probe image.

14. The system of claim 1, wherein the probe image is one of a plurality of images that track the person, the plurality of images being received from the vision device, wherein generating, using the supporting engine, the second label for the person depicted in the probe image comprises:
determining, using the trained facial classification neural engine, that at least a threshold number of the plurality of images have a specified identification with a probability within a predefined high accuracy range; and
determining that the probe image has the specified identification based on the at least the threshold number of the plurality of images having the specified identification.

15. The system of claim 14, the operations further comprising:
identifying the plurality of images that track the person based on timestamps associated with the plurality of images and a physical position of the person within a space depicted in the plurality of images.

16. A non-transitory machine-readable medium storing instructions which, when executed by processing circuitry of one or more computing machines, cause the processing circuitry to perform operations comprising:
receiving, from a vision device comprising one or more cameras, a probe image;
generating, using a trained facial classification neural engine, a first label for a person depicted in the probe image, the first label acting as an identifier of the person, and generating a probability for the first label, the probability corresponding to a confidence that the first label accurately identifies the person;
determining whether the probability is within a predefined high accuracy range;
if the probability is within the predefined high accuracy range, allowing access by the person to a physical location or an electronic resource; and
if the probability is not within the predefined high accuracy range:
allowing or denying access by the person to the physical location or electronic resource based on additional authentication information provided by the person; and
determining whether the probability is within a predefined low accuracy range, and if so:
generating, using a supporting engine, a second label for the person depicted in the probe image, the second label acting as an identifier of the person, wherein the supporting engine operates independently of the trained facial classification neural engine; and
further training the facial classification neural engine based on the second label.

17. The machine-readable medium of claim 16, the operations further comprising:
using the further trained facial classification neural engine to identify one or more persons in visual data from the vision device; and
based on the identified one or more persons in the visual data, controlling access to the physical location or electronic resource for the one or more persons.

18. The machine-readable medium of claim 16, wherein generating, using the supporting engine, the second label for the person depicted in the probe image comprises:
providing the probe image to a training dataset for a semi-supervised learning facial classification engine;
training the semi-supervised learning facial classification engine using the training dataset;
generating, using the semi-supervised learning facial classification engine, the second label for the person depicted in the probe image and a probability value for the second label; and
adjusting the trained facial classification neural engine based on the trained semi-supervised learning facial classification engine.

19. The machine-readable medium of claim 16, wherein the probe image is one of a plurality of images that track the person, the plurality of images being received from the vision device, wherein generating, using the supporting engine, the second label for the person depicted in the probe image comprises:
determining, using the trained facial classification neural engine, that at least a threshold number of the plurality of images have a specified identification with a probability within a predefined high accuracy range; and
determining that the probe image has the specified identification based on the at least the threshold number of the plurality of images having the specified identification.

20. A method comprising:
receiving, from a vision device comprising one or more cameras, a probe image;
generating, using a trained facial classification neural engine, a first label for a person depicted in the probe image, the first label acting as an identifier of the person, and generating a probability for the first label, the probability corresponding to a confidence that the first label accurately identifies the person;
determining a high accuracy range, wherein access by the person to a physical location or an electronic resource is allowed when the probability is within the high accuracy range;
determining that the probability is not within the high accuracy range, and allowing or denying access by the person to the physical location or electronic resource based on additional authentication information provided by the person;
determining that the probability is within a low accuracy range, and generating, using a supporting engine, a second label for the person depicted in the probe image, the second label acting as an identifier of the person, wherein the supporting engine operates independently of the trained facial classification neural engine; and
training the facial classification neural engine based on the second label.

* * * * *